(12) United States Patent
Nishikawa et al.

(10) Patent No.: US 8,335,168 B2
(45) Date of Patent: Dec. 18, 2012

(54) MOBILE COMMUNICATION SYSTEM, BASE STATION APPARATUS, USER EQUIPMENT, AND METHOD

(75) Inventors: Daisuke Nishikawa, Yokosuka (JP); Yoshihisa Kishiyama, Yokosuka (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 340 days.

(21) Appl. No.: 12/744,623

(22) PCT Filed: Dec. 11, 2008

(86) PCT No.: PCT/JP2008/072532
§ 371 (c)(1),
(2), (4) Date: May 25, 2010

(87) PCT Pub. No.: WO2009/075331
PCT Pub. Date: Jun. 18, 2009

(65) Prior Publication Data
US 2010/0254276 A1    Oct. 7, 2010

(30) Foreign Application Priority Data
Dec. 13, 2007 (JP) ................................. 2007-322371

(51) Int. Cl.
*H04J 1/16* (2006.01)
*H04Q 7/00* (2006.01)

(52) U.S. Cl. .......................... 370/252; 370/318; 370/328

(58) Field of Classification Search .................. 370/252, 370/318, 329, 322
See application file for complete search history.

(56) References Cited

U.S. PATENT DOCUMENTS

| | | | | |
|---|---|---|---|---|
| 2004/0132405 | A1* | 7/2004 | Kitazawa et al. | 455/13.4 |
| 2008/0117882 | A1* | 5/2008 | Ohmi et al. | 370/336 |
| 2009/0175369 | A1* | 7/2009 | Atarashi et al. | 375/260 |
| 2009/0274078 | A1* | 11/2009 | Zhao et al. | 370/293 |
| 2010/0238876 | A1* | 9/2010 | Yamamoto et al. | 370/329 |
| 2010/0254276 | A1* | 10/2010 | Nishikawa et al. | 370/252 |
| 2010/0278152 | A1* | 11/2010 | Andreozzi et al. | 370/335 |
| 2011/0206060 | A1* | 8/2011 | Ohmi et al. | 370/445 |

(Continued)

FOREIGN PATENT DOCUMENTS

JP    2004-104293 A    4/2004

(Continued)

OTHER PUBLICATIONS

Patent Abstracts of Japan, Publication No. 2004-104293, dated Apr. 2, 2004, 1 page.

(Continued)

*Primary Examiner* — Andrew Lee
(74) *Attorney, Agent, or Firm* — Osha Liang LLP

(57) ABSTRACT

A base station apparatus includes a measurement unit, a scheduling unit, and a transmission unit. The measurement unit measures received quality of a reference signal. The scheduling unit provides scheduling information indicating allocation of a radio resource in uplink. The transmission unit transmits a control signal including the scheduling information. After a first packet is transmitted using a first frequency band, a retransmission packet of the first packet is transmitted using a second frequency band other than the first frequency band. The control signal further includes information indicating a difference between received quality in the first frequency band and that in the second frequency band. The retransmission packet is transmitted at a transmission power level determined by adding a transmission power level of the first packet to that corresponding to the difference.

14 Claims, 10 Drawing Sheets

U.S. PATENT DOCUMENTS

2011/0216724 A1* 9/2011 Zhao et al. .................... 370/329
2012/0069803 A1* 3/2012 Iwamura et al. ............. 370/329
2012/0082121 A1* 4/2012 Zhao et al. .................... 370/329

FOREIGN PATENT DOCUMENTS

JP 2007-028568 A 2/2007

OTHER PUBLICATIONS

Patent Abstracts of Japan, Publication No. 2007-028568, dated Feb. 1, 2007, 1 page.

Ericsson, "Power Control for Retransmissions," TSG-RAN WG1, R1-080880, Feb. 11-15, 2008, 1 page.

3GPP TR 25.814 V7.1.0, Sep. 2006, Physical layer aspects for evolved Universal Terrestrial Radio Access (UTRA), 132 pages.

International Search Report issued in PCT/JP2008/072532, mailed on Mar. 17, 2009, with translation, 7 pages.

Written Opinion issued in PCT/JP2008/072532, mailed on Mar. 17, 2009, 3 pages.

* cited by examiner

MOBILE COMMUNICATION SYSTEM, BASE STATION APPARATUS, USER EQUIPMENT, AND METHOD

TECHNICAL FIELD

The present invention generally relates to a technical field of a mobile communication, and more particularly to an uplink transmission power control.

BACKGROUND ART

In this kind of technical filed, research and development of a next-generation mobile communication system of the 3rd-generation mobile communication system have been conducted by 3GPP (3rd Generation Partnership Project) which is a standards body of the Wideband Code Division Multiple Access (W-CDMA) System. Especially, as the next-generation communication system of the W-CDMA (Wideband Code Division Multiple Access) system, the HSDPA (High Speed Downlink Packet Access) system and the like, research and development of the LTE (Long Term Evolution) system have been conducted at high speed. In the LTE system as a radio access system, an OFDM (Orthogonal Frequency Division Multiplexing) scheme and an SC-FDMA (Single-Carrier Frequency Division Multiple Access) scheme are used in the downlink communications and the uplink communications, respectively (see, for example, Non-Patent Document 1).

The OFDM scheme is a multi-carrier transmission scheme in which a frequency band is divided into plural sub-carriers having narrower frequency bands, and data are mapped onto the sub-carriers so as to be transmitted. By arranging the sub-carriers on the frequency axis in a manner such that the sub-carriers are orthogonal to each other, a faster transmission rate can be achieved and frequency use efficiency can be improved.

The SC-FDMA scheme is a single-carrier transmission scheme in which a frequency band is divided into plural narrower frequency bands so that the divided frequency bands are allocated to plural user equipment (UE) terminals. As a result, the user equipment (UE) terminals can transmit using different frequency bands from each other, thereby reducing the interference between the user equipment (UE) terminals. Further, in the SC-FDMA scheme, a range of the fluctuation of the transmission power may be made smaller; therefore, lower energy consumption of terminals may be achieved and a wider coverage area may also be obtained.

In uplink communications, signals in a cell are orthogonally transmitted based on the SC-FDMA (Single-Carrier Frequency Division Multiple Access) scheme. However, in other cells, the same frequency band may be used. Therefore, it may be necessary to adequately control the other-cell interference. To that end, it may be desirable to carefully control the transmission power level of the user equipment (UE) terminal especially located at the edge of the cells.

In a general mobile communication system, from the viewpoints of promoting the increase of link capacity and battery saving opportunities in the user equipment (UE) terminals, transmission power control (TPC) is being performed. As the transmission power control (TPC), there may be two types of control methods: one is open-loop control in which the control is performed with a relatively long cycle period, and the other is closed-loop control in which the control is performed with a relatively short cycle period. The open-loop control may be preferably conducted so as to reduce the influence not depending on instantaneous fading such as distance attenuation and shadowing. On the other hand, the closed-loop control may be preferably conducted from the viewpoint of the requirements of a quick response to the influence of fading and a setting error of the transmission power level of a user equipment (UE) terminal. To improve the accuracy of the transmission power control (TPC), it may be preferable to use these two control methods together.

In so-called a circuit-switching communication system such as the W-CDMA system, a specific dedicated channel is allocated to a user equipment (UE) terminal, and the transmission power level of the user equipment (UE) terminal is gradually adjusted based on a past continuous record of the user equipment (UE) terminal. On the other hand, in so-called a packet exchange communication system such as the LTE system, no specific dedicated channel is allocated to a user equipment (UE) terminal. Therefore, in the transmission power control (TPC) for the uplink of the LTE system, the user equipment (UE) terminal transmits a sounding reference signal (SRS) to a base station apparatus across the entire system bandwidth at short intervals (e.g., every 2 ms). The base station apparatus measures the received quality of the Sounding Reference Signal (SRS), and determines the degree to which the transmission power level is to be changed from a reference value when the user equipment (UE) terminal transmits a Physical Uplink Shared Channel (PUSCH) next time. The reference value is the transmission power level determined in the open-loop control.

(Transmission power level)=(reference value)+(correction value)

This correction value (offset) is expressed in a TPC bit pattern. The TPC bit pattern is transmitted to the user equipment (UE) terminal in a Physical Downlink Control Channel (PDCCH) (L1/L2 control channel). Otherwise, the TPC bit pattern may be transmitted as data of an uplink scheduling grant in the Physical Downlink Control Channel (PDCCH). In the W-CDMA system, one bit is allocated to the TPC bit pattern, and the transmission power level is corrected (changed) by, for example, one dB at a time. However, in the LTE system, transmission intervals of the user equipment (UE) terminal, (i.e., correction intervals of the transmission power level) are discretely distributed. Because of this feature, the range of the correction values may be wide, and therefore, a greater number of bits may be required to be allocated. As a result, the influence of the TPC bit pattern on a control traffic amount may become large. Therefore, it is desirable that the TPC bit pattern be transmitted without wasting bits.

On the other hand, in uplink of the LTE system, a Synchronous Hybrid Automatic Repeat reQuest (HARQ) method is also conducted. In this retransmission method, the timing to transmit the retransmission packet is determined in advance. For example, a packet may be retransmitted as a retransmission packet in a frame six frames later than the frame in which the packet has been initially transmitted as an initial packet. In this case, as described above, the uplink transmission control is performed on the initial packet so that the initial packet can be transmitted with an appropriate transmission power level. This transmission power control (TPC) based on the above-described method may also be applied to the retransmission packet.

FIG. 1 schematically shows where a user equipment (UE) terminal receives the uplink scheduling grant and then, the user equipment (UE) terminal transmits the Physical Uplink Shared Channel (PUSCH). More specifically, first, the user equipment (UE) terminal receives the uplink scheduling grant (UL-grant1). Then, based on the scheduling information in the UL-grant1, the user equipment (UE) terminal transmits an initial packet (i.e., PUSCH). The transmission power level of this transmission is determined based on the TPC bit pattern (having x bits) in the UL-grant1. However, there may be a case where the initial packet (PUSCH) has not been normally received by the base station apparatus and, as a result, the NACK signal is transmitted to the user equipment (UE) terminal via the PDCCH. In this case as well, the user equipment (UE) terminal transmits the retransmission packet based on the scheduling information in the uplink scheduling grant (UL-grant2). The transmission power level of this transmission is determined based on the TPC bit pattern (having the same x bits) in the UL-grant2.

However, there are many bits in the TPC bit pattern, and there is little time difference between the transmission of the initial packet and that of the retransmission packet. When considering those matters, from the viewpoint of effectively performing the power control while minimizing the number of bits of the TPC bit pattern, it may not be preferable that the transmission power levels of all the retransmission packets are regulated under the same transmission power control as that for the initial packet. Therefore, the TPC bit pattern may be omitted for the retransmission packets.

On the other hand, in the LTE system, it is not always the case that the frequency band (i.e., resource blocks) used for the initial packet is the same as that used for the retransmission packet. When viewed otherwise, when a resource block not the same as that used for the initial packet is used for the retransmission packet, a more enhanced frequency diversity effect may be obtained, and therefore, reliability may be improved. However, when different resources are used for the initial packet and the retransmission packets, the appropriate transmission power level of the initial packet is not always the same as that of the retransmission packets; in other words, it is normal that the appropriate transmission power level of the initial packet may differ from that of the retransmission packets. If this is the case, all of the initial packet and the following retransmission packets may be required to be separately controlled. However, this separate control may work against the demand for minimizing the number of bits of the TPC bit pattern.

Non-Patent Document 1: 3GPP TR 25.814 (V7.1.0), "Physical Layer Aspects for Evolved UTRA," September 2006.

DISCLOSURE OF INVENTION

Problems to be Solved by the Invention

According to an aspect of the present invention, when a Physical Uplink Shared Channel (PUSCH) is transmitted using a first resource block, and then the retransmission packet of the PUSCH is transmitted using a second resource block other than the first resource block, the uplink transmission power level of the transmission of the retransmission packet may be adequately controlled.

Means for Solving the Problems

According to an aspect of the present invention, there is provided a mobile communication system including a base station apparatus and a user equipment terminal. In the mobile communication system, the base station apparatus includes a measurement unit measuring received quality of a reference signal transmitted from the user equipment terminal, a scheduling unit providing scheduling information indicating allocation of a radio resource in uplink, and a transmission unit transmitting a control signal to the user equipment terminal, the control signal including at least the scheduling information. Further, the user equipment terminal includes a receiving unit receiving the control signal from the base station apparatus, the control signal including at least scheduling information indicating allocation of the radio resource, and a transmission unit transmitting a packet to the base station apparatus in accordance with the scheduling information. Further, in the mobile communication system, in a case where, after a first packet is transmitted from the user equipment terminal using a first frequency band, a retransmission packet corresponding to the first packet is transmitted from the user equipment terminal using a second frequency band other than the first frequency band, the control signal further includes information indicating a difference between received quality in the first frequency band and received quality in the second frequency band, and the retransmission packet is transmitted from the user equipment terminal at a transmission power level determined by adding a transmission power level of the first packet to a transmission power level corresponding to the difference.

Advantageous Effect of the Invention

According to an aspect of the present invention, when a Physical Uplink Shared Channel (PUSCH) is transmitted using a first resource block, and then the retransmission packet of the PUSCH is transmitted using a second resource block other than the first resource block, the uplink transmission power level of the transmission of the retransmission packet may be adequately controlled.

EXPLANATION OF REFERENCES

Figure 1:
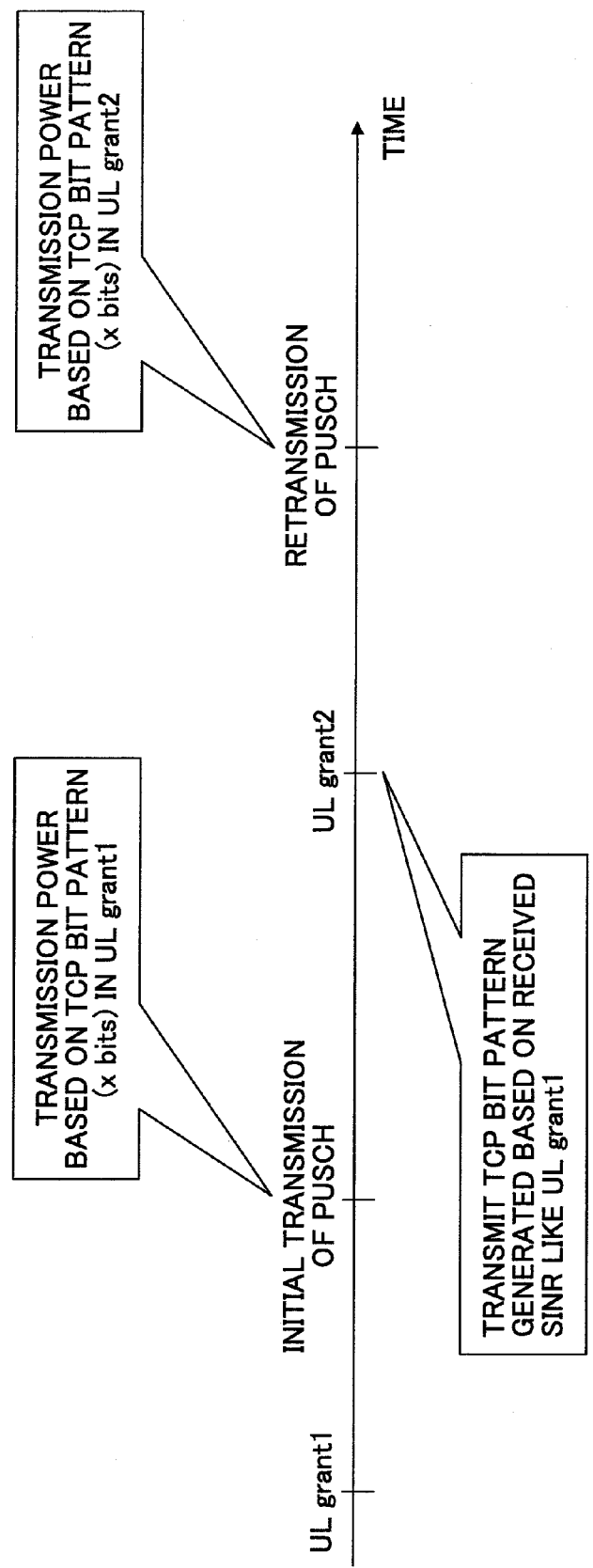
FIG. 1 is a drawing illustrating an operation of a user equipment (UE) terminal.

202: ANTENNA
204: AMPLIFIER
206: TRANSMISSION/RECEIVING SECTION
208: BASEBAND PROCESSING SECTION
210: CALL PROCESSING SECTION
212: TRANSMISSION PATH INTERFACE
2081: LAYER 1 PROCESSING SECTION
2082: MAC PROCESSING SECTION
2083: RLC PROCESSING SECTION
2084: RECEIVED SINR MEASUREMENT SECTION
2085: TPC BIT PATTERN GENERATION SECTION
102: ANTENNA
104: AMPLIFIER

106: TRANSMISSION/RECEIVING SECTION
108: BASEBAND PROCESSING SECTION
110: CALL PROCESSING SECTION
112: APPLICATION SECTION

Best Mode for Carrying Out the Invention

According to an embodiment of the present invention, there is provided a base station apparatus in a mobile communication system. The base station apparatus includes a measurement unit measuring received quality of a reference signal transmitted from a user equipment terminal, a scheduling unit providing scheduling information indicating allocation of a radio resource in uplink, and a transmission unit transmitting a control signal to the user equipment terminal, the control signal including at least the scheduling information. Further in the base station apparatus, in a case where, after a first packet is transmitted from the user equipment terminal using a first frequency band, a retransmission packet corresponding to the first packet is transmitted from the user equipment terminal using a second frequency band other than the first frequency band, the control signal further includes information indicating a difference between received quality in the first frequency band and received quality in the second frequency band, and the retransmission packet is transmitted from the user equipment terminal at a transmission power level determined by adding a transmission power level of the first packet to a transmission power level corresponding to the difference.

Further, the information indicating the difference may be expressed in a transmission power control bit pattern in the uplink scheduling grant.

Further, the reference signal may be a sounding reference signal periodically transmitted from the user equipment terminal, and the measurement unit measures the received quality per resource block.

According to another embodiment of the present invention, there is provided a user equipment terminal in a mobile communication system. The user equipment terminal includes a receiving unit receiving a control signal from a base station apparatus, the control signal including at least scheduling information indicating allocation of a radio resource, and a transmission unit transmitting a packet to the base station apparatus in accordance with the scheduling information. Further, in the user equipment terminal, in a case where, after a first packet is transmitted to the base station apparatus using a first frequency band, a retransmission packet corresponding to the first packet is transmitted to the base station apparatus using a second frequency band other than the first frequency band, the control signal further includes information indicating a difference between received quality in the first frequency band and received quality in the second frequency band, and the retransmission packet is transmitted from the transmission unit at a transmission power level determined by adding a transmission power level of the first packet to a transmission power level corresponding to the difference.

According to another embodiment of the present invention, there is provided a base station apparatus in a mobile communication system. The base station apparatus includes a measurement unit measuring received quality of a reference signal per resource block, the reference signal being received from a user equipment terminal, and a notification unit notifying the user equipment terminal of a radio resource usable by the user equipment terminal in uplink when persistent scheduling is performed. Further, in the base station apparatus, the notification unit notifies the user equipment terminal of a fact that, after a first packet is transmitted from the user equipment terminal using a first frequency band, a retransmission packet corresponding to the first packet is to be transmitted from the user equipment terminal using a second frequency band other than the first frequency band, and of information indicating a difference between received quality in the first frequency band and received quality in the second frequency band; and the retransmission packet is transmitted from the user equipment terminal at a transmission power level determined by adding a transmission power level of the first packet to a transmission power level corresponding to the difference.

According to another embodiment of the present invention, there is provided a user equipment terminal in a mobile communication system. The user equipment terminal includes a receiving unit receiving a notice of a radio resource usable in uplink, the notice being received from the base station apparatus, when persistent scheduling is performed, and a transmission unit transmitting a packet to the base station apparatus using the reported radio resource. Further, in the user equipment terminal, the notice includes a fact that, after a first packet is transmitted from the user equipment terminal using a first frequency band, a retransmission packet corresponding to the first packet is to be transmitted from the user equipment terminal using a second frequency band other than the first frequency band, and information indicating a difference between received quality in the first frequency band and received quality in the second frequency band; and the retransmission packet is transmitted from the transmission unit at a transmission power level determined by adding a transmission power level of the first packet to a transmission power level corresponding to the difference.

For explanatory purposes, to promote an understanding of the present invention, specific values are used as examples in the description. However, it should be noted that such specific values are sample values only unless otherwise described, and any other appropriate values may be used.

First Embodiment

System Outline

Figure 2:
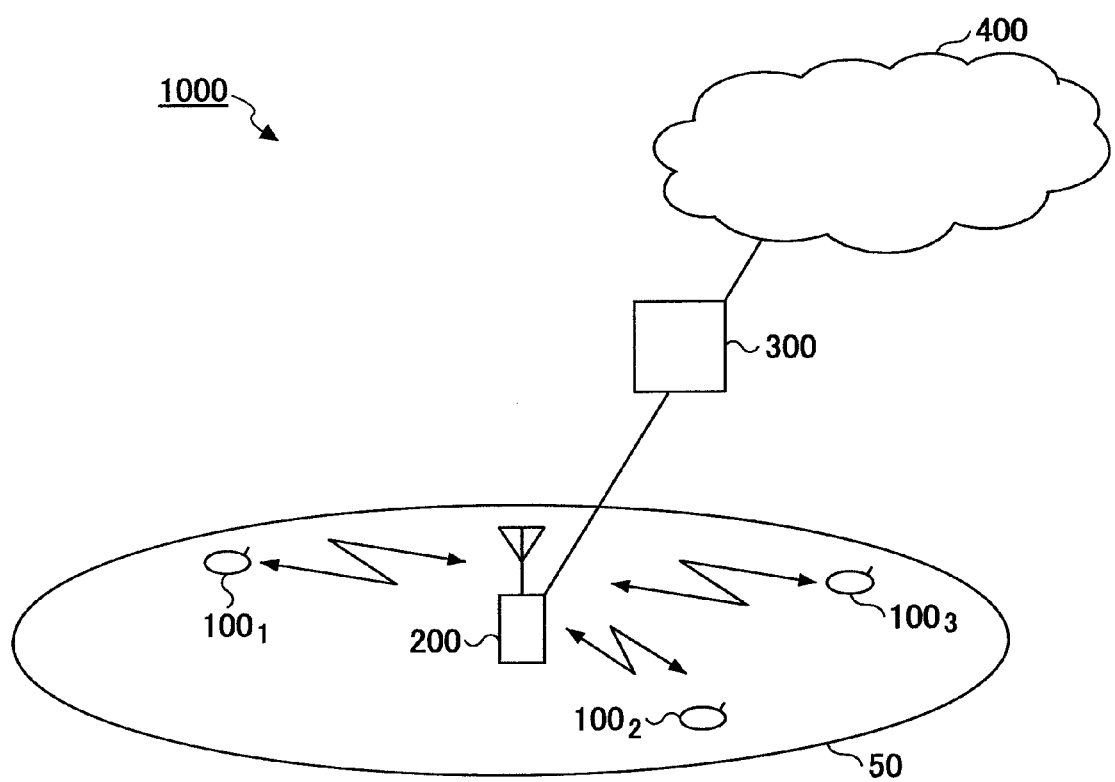
FIG. 2 is a drawing showing a mobile communication system according to an embodiment of the present invention.

FIG. 2 illustrates a mobile communication system 1000 according to an embodiment of the present invention. For explanatory purposes, the mobile communication system 1000 is assumed to be an LTE (Long Term Evolution) system. However, the present invention is not limited to the LTE system. For example, the present invention may be applied to any appropriate system where transmission power control may be performed. However, in a case where the SC-FDMA scheme is used in uplink, especially when considering that more accurate transmission power control is to be performed on a user equipment (UE) terminal especially located at the edge of a cell and that the number of bits of the TPC bit pattern is to be minimized when synchronous HARQ is used, it may be perceived that the present invention described below may be especially advantageously applied to the LTE system. Referring back to FIG. 2, the mobile communication system 1000 includes user equipment (UE) terminals 100$_n$ (n=1, 2, ... ), a base station apparatus (eNB) 200 having a cell 50, an access gateway 300, and a core network 400. Typically, the user equipment (UE) terminal may be a mobile station. However, a fixed station may also be used as the user equipment (UE) terminal. The user equipment (UE) terminal 100$_n$ in the cell 50 establishes a radio link with the base station apparatus (eNB) 200 to perform radio communications. For pictorial convenience, there is only one cell 50 depicted in FIG. 2. However, any number of cells may be provided. The base station apparatus (eNB) 200 is connected to the core network 400 via the access gateway 300.

In the LTE system, in both uplink and downlink, communications are performed by allocating one or more resource blocks to the user equipment (UE) terminal. Further, the resource blocks are shared among plural user equipment (UE) terminals in the system. The base station apparatus (eNB) determines which resource block is to be allocated to a user equipment (UE) terminal among plural user equipment (UE) terminals with respect to each sub-frame having 1 ms period in the LTE system. The sub-frame may be called a TTI (Transmission Time Interval). The determination of the allocation of the radio resources is called scheduling. In downlink, the base station apparatus (eNB) uses one or more resource blocks to transmit a shared channel to the user equipment (UE) terminal selected in the scheduling. This shared channel is called a Physical Downlink Shared Channel (PDSCH). On the other hand, in uplink, the user equipment (UE) terminal selected in the scheduling transmits a shared channel to the base station apparatus (eNB). This shared channel is called a Physical Uplink Shared Channel (PUSCH).

In a communication system where the above-described shared channels are used, it is required to perform signaling and report information indicating which resource block is to be allocated to the user equipment (UE) terminal with respect to each sub-frame. This signaling (notification) is performed using a control channel. In the LTE system, this control channel is called a Physical Downlink Control Channel (PDCCH) or a Downlink L1/L2 Control Channel (DL-L1/L2 Control Channel). The Physical Downlink Control Channel (PDCCH) includes, for example:

Downlink Scheduling Information,
    Acknowledgement Information (ACK/NACK: Acknowledgement/Non-Acknowledgement information),
    Uplink Scheduling Grant,
    Transmission Power Control Command Bit.

The Downlink Scheduling Information and the Uplink Scheduling Grant (i.e., Uplink Scheduling Information) correspond to information that is to be reported through the signaling. The Downlink Scheduling Information includes information indicating the downlink shared channel such as allocation information of downlink resource blocks, an ID of a user equipment (UE) terminal, the number of streams, information about a Pre-coding Vector, data size, a modulation scheme, information of a Hybrid Automatic Repeat reQuest (HARQ) and the like.

Further, the Uplink Scheduling Grant includes information indicating the uplink shared channel such as allocation information of uplink resources, the ID of a user equipment (UE) terminal, the data size, the modulation scheme, uplink transmission power information (TCP bit), information of a Demodulation Reference Signal in an uplink MIMO and the like.

Transmission Power Control 1

Figure 3:
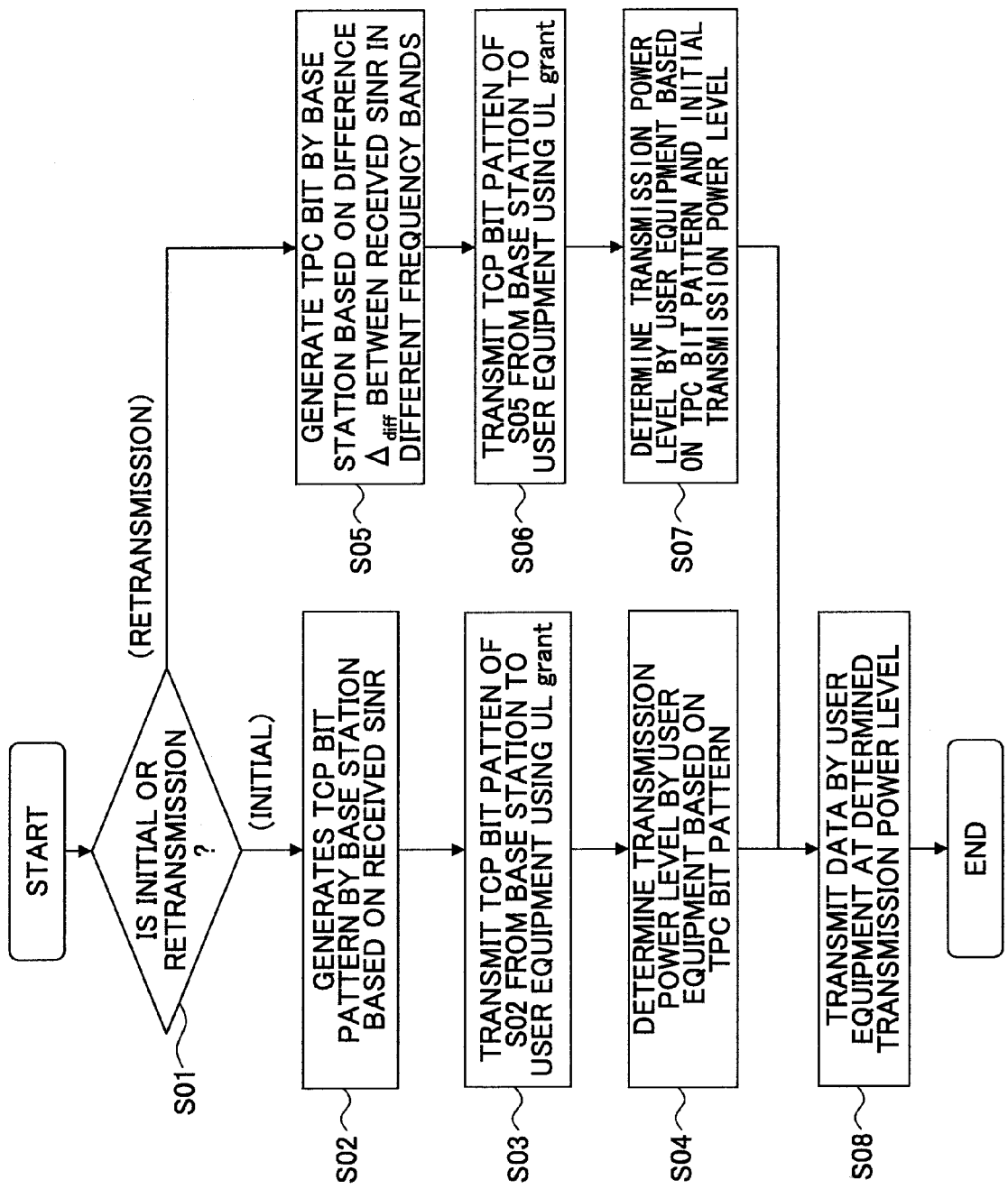
FIG. 3 is a flowchart illustrating an exemplary process of transmission power control according to an embodiment of the present invention.

FIG. 3 is a flowchart illustrating an exemplary process of transmission power control according to an embodiment of the present invention. Basically, the transmission power control is to be performed on all the user equipment (UE) terminals located in a cell (coverage area) of the base station apparatus (eNB). However, as described above, when the SC-FDMA scheme is used in uplink, attention is to be paid to the transmission power control of the user equipment (UE) terminal especially located at the edge of the cell. As illustrated in FIG. 3, first, in step S01, the scheduling allocating the radio resources in uplink is performed, and a user equipment (UE) terminal and a transmission format are determined so that the PUSCH is transmitted from the user equipment (UE) terminal using the transmission format in a next uplink communication. Further, the base station apparatus (eNB) determines whether the radio resource allocated to the user equipment (UE) terminal (scheduling target) is to be used for the transmission of an "initial packet" or the transmission of a "retransmission packet". The initial packet refers to a packet which has not been transmitted from the user equipment (UE) terminal. On the other hand, the retransmission packet refers to a packet to be retransmitted from the user equipment (UE) terminal when the corresponding packet having been transmitted before has not been normally received by the base station apparatus (eNB). The retransmission may be repeated up to the maximum number predetermined in the system. Further, in the description below, the initial packet and the retransmission packet are exemplarily described. However, the method described below may also be applied to the retransmission packet and the following retransmission packet (i.e. a retransmission packet to be re-transmitted as the retransmission of the retransmission packet). Generally, the present invention may be applied to a retransmission packet and a packet transmitted before the transmission of the retransmission packet. The base station apparatus (eNB) determines whether the scheduling target (i.e., the radio resource allocated to the user equipment (UE) terminal) is to be used for the initial packet or the retransmission packet by recording and checking the information indicating the PUSCH for which the NACK signal has been returned. When determining that the scheduling target is to be used for the initial packet ("INITIAL" in step S01), the process goes to step S02 to perform processes from step S02.

In step S02, based on the received SINR (Signal-to-Interference and Noise power Ratio) of the Sounding Reference Signal (SRS), the transmission power level to be set to transmit the initial packet is determined. More specifically, when the user equipment (UE) terminal transmits the PUSCH, it is determined to what extent the transmission power level is to be changed from a reference value. The reference value refers to a transmission power level determined in open-loop control.

(Transmission power level)=(reference value)+(correction value)

The correction value is expressed using the TPC bit pattern.

Next, in step S03, the TPC bit pattern is included in the uplink scheduling grant in the PDCCH, and reported (transmitted) from the base station apparatus (eNB) to the user equipment (UE) terminal.

Next, in step S04, the user equipment (UE) terminal receives the PDCCH and checks the uplink scheduling grant. Then, the user equipment (UE) terminal takes out a not-yet-transmitted packet (i.e., an initial packet) from a transmission buffer. Further, based on the reference value and TCP bit pattern, the user equipment (UE) terminal determines the transmission power level at which the initial packet is to be transmitted.

After step S04, the process goes to step S08. In step S08, the user equipment (UE) terminal transmits the initial packet at the transmission power level determined in step S04. The resource block and the transmission format to be used for the initial packet are designated in the uplink scheduling grant; therefore, the uplink transmission is performed based on the designations of the resource block and the transmission format.

On the other hand, when determining that the scheduling target is to be used for the transmission of the retransmission packet ("RETRANSMISSION" in step S01), the process goes to step S05.

In step S05, a resource block (RB1) used for the initial packet and a resource block (RB2) allocated to the retransmission packet are checked (detected). Herein, the frequencies of the resource blocks RB1 and RB2 are defined as f1 and f2, respectively. As described above, the base station apparatus (eNB) measures the received quality (typically the received SINR) of the Sounding Reference Signal (SRS) transmitted across the entire system frequency band.

Figure 4:
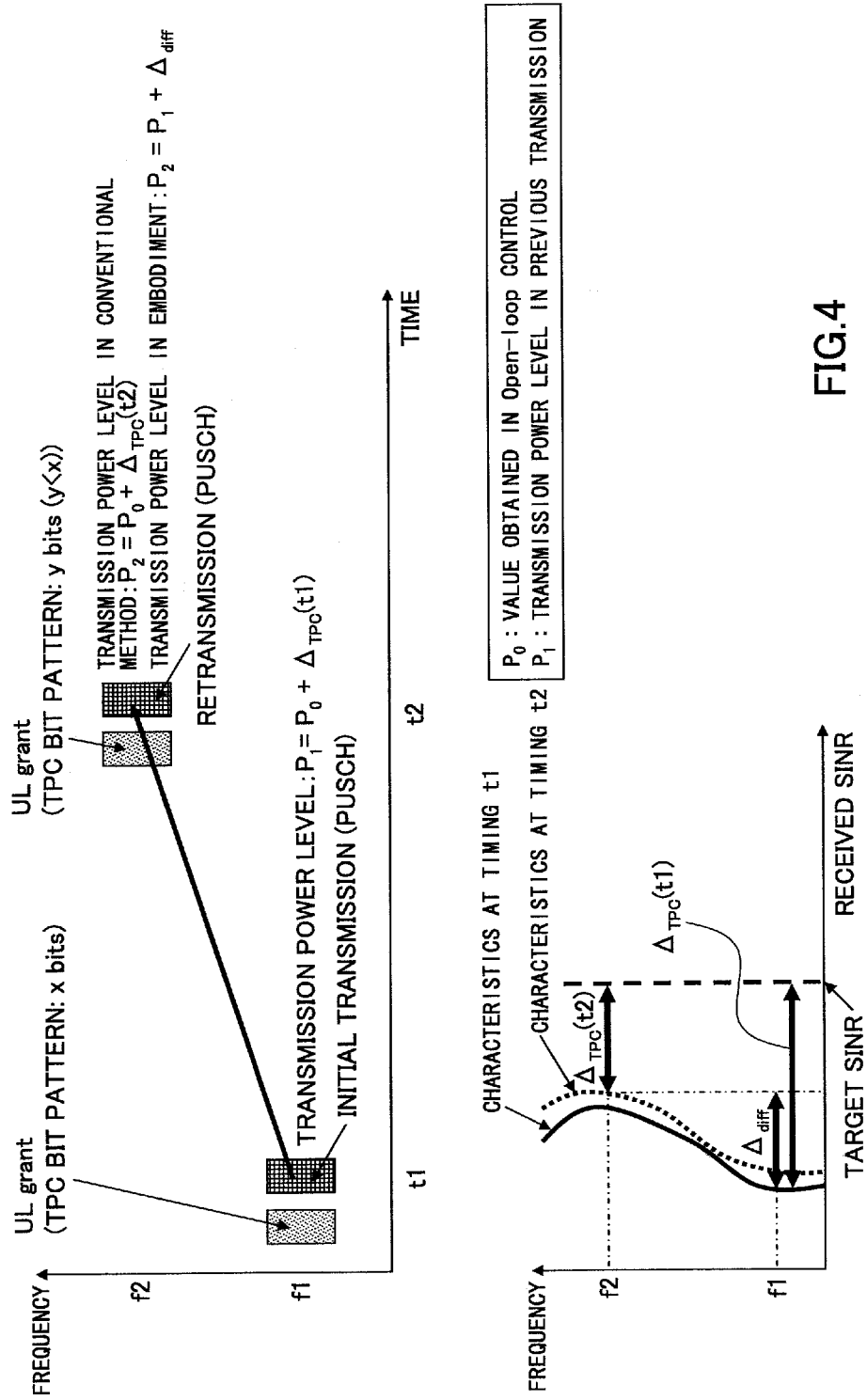
FIG. 4 is a drawing illustrating an example of transmission power control.

As illustrated in the lower portion of FIG. 4, in step S04, a difference "$\Delta_{diff}$" is derived between the received SINR(f=f1) of the initial packet at frequency f1 and the received SINR (f=f2) of the retransmission packet at frequency f2. The TCP bit "$\Delta_{TPC}(t1)$" derived in step S02 of FIG. 3 corresponds to a difference between the received SINR and the target SINR at frequency f1. Therefore, the transmission power level $P_1$ determined in step S04 is given by the following formula:

$$P_1 = P_0 + \Delta_{TPC}(t1)$$

Where, the symbol "$P_0$" denotes the transmission power level determined in the open-loop control, and is given as the received SINR of the Sounding Reference Signal (SRS) in the lower portion of FIG. 4. Namely, the received SINR is not an instantaneous value but an average value. On the other hand, in step S05 of FIG. 3, the TCP bit pattern is set so that the difference $\Delta_{diff}$ is expressed by the TCP bit pattern. The difference $\Delta_{diff}$ expressed in the TCP bit pattern is much different from the difference between the target SINR and the received SINR used in the conventional method in step S02.

Next, in step S06, the uplink scheduling grant including the TPC bit pattern is transmitted from the base station apparatus (eNB) to the user equipment (UE) terminal.

Next, in step S07, the user equipment (UE) terminal receives the PDCCH, and checks the uplink scheduling grant. Then, from the transmission buffer, the user equipment (UE) terminal takes out a packet to be retransmitted (i.e., retransmission packet). Then, the user equipment (UE) terminal determines the transmission power level at which the retransmission packet is to be transmitted. In the case of step S04, the transmission power level is determined by adding the reference $P_0$ to the amount $\Delta_{TPC}(t1)$. On the other hand, in step S07, the transmission power level $P_2$ is determined by adding the transmission power level $P_1$ of the initial packet to the difference $\Delta_{diff}$ expressed in the TCP bit pattern, as given in the following formula:

$$P_2 = P_1 + \Delta_{diff}$$

After step S07, the process goes to step S08. In step S08, the user equipment (UE) terminal transmits the retransmission packet at the transmission power level determined in step S07. The resource block and the transmission format to be used in the transmission of the retransmission packet are designated in the uplink scheduling grant; therefore, the uplink transmission is performed based on the designations. In this example, as illustrated in the upper portion of FIG. 4, the retransmission packet is transmitted using a resource block other than that used in the transmission of the initial packet.

The difference $\Delta_{diff}$ is derived from the difference between the received SINR(f=f1) at frequency f1 and the received SINR(f=f2) at frequency f2. As illustrated in the lower portion of FIG. 4, this difference $\Delta_{diff}$ also corresponds to the difference between the amount $\Delta_{TPC}(t1)$ and the amount $\Delta_{TPC}(t2)$. As a result, the transmission power level $P_2$ of the retransmission packet determined in this embodiment may be expressed in the following formula:

$$P_2 = P_1 + \Delta_{diff} = P_0 + \Delta_{TPC}(t2)$$

In this formula, the utmost right-hand side (i.e., $P_0 + \Delta_{TPC}(t2)$) indicates a case where the transmission power level of the retransmission packet is independently controlled (determined) similar to the case of determining the transmission power level of the initial packet. Namely, the transmission power level $P_2$ of the retransmission packet is determined by adding the difference between the target SINR and the received SINR at the same frequency f2 to the reference value $P_0$. Therefore, the transmission power level ($P_1 + \Delta_{diff}$) obtained according to this embodiment is the same as the transmission power level ($P_0 + \Delta_{TPC}(t2)$) derived in the conventional method. According to this embodiment, what is required for the TPC bit pattern is to express only the difference between the transmission power level of a packet (e.g. retransmission packet) and the transmission power level of the packet in the previous transmission (e.g. initial packet). In contract, what is required for the TPC bit pattern in the conventional method is to express the difference between the target SINR and the received SINR each time regardless of the SINR value in the previous transmission. Because of this difference, the number of bits in the TPC bit pattern in this embodiment may be less than that in the TPC bit pattern in the conventional method.

Figure 5:
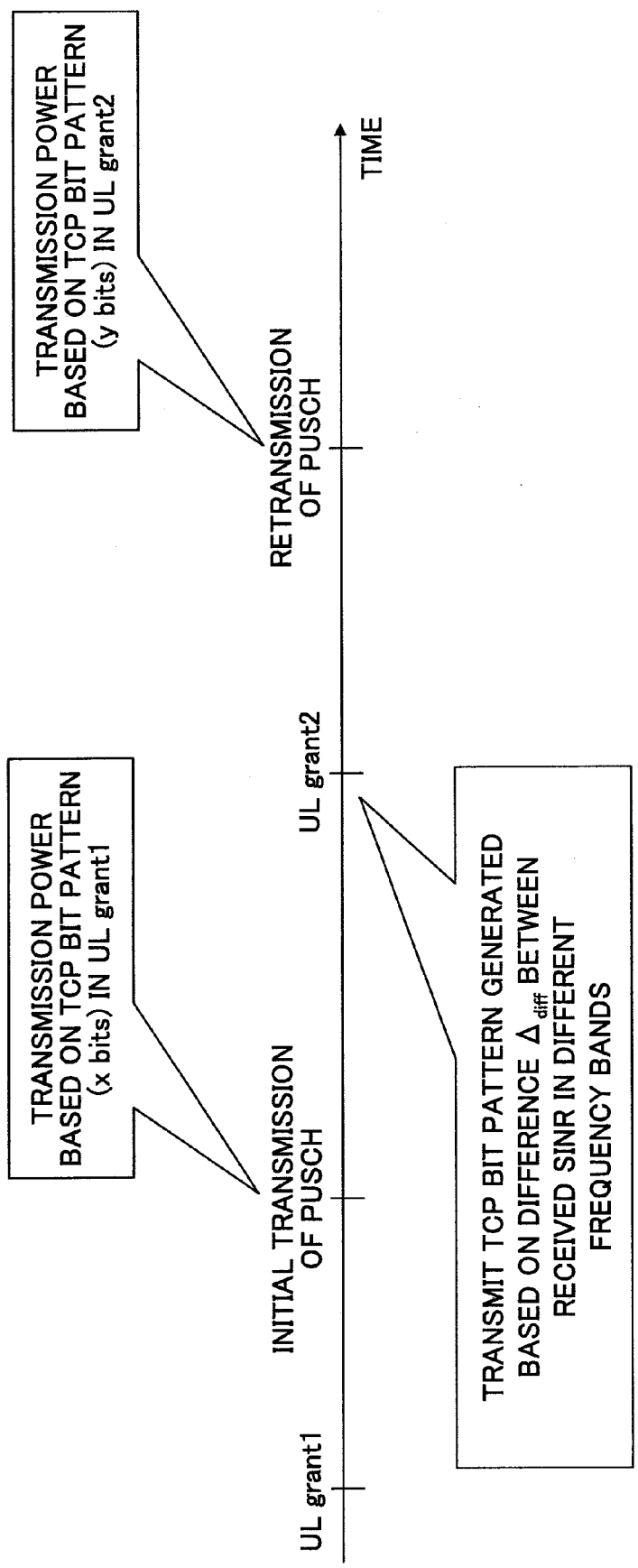
FIG. 5 is a drawing illustrating an operation of a user equipment (UE) terminal.

FIG. 5 illustrates the operations of the user equipment (UE) terminal. As illustrated in FIG. 5, first, the user equipment (UE) terminal receives the uplink scheduling grant, and the PUSCH is transmitted from the user equipment (UE) terminal similar to the case of FIG. 1. However, unlike the case of FIG. 1, in the case of FIG. 5, the TPC bit pattern representing the difference $\Delta_{diff}$ is included in the uplink scheduling grant (UL grant2) corresponding to the retransmission packet, and is reported. The number of bits (y) of this TPC bit pattern may be less than the number of bits (x) of the TPC bit pattern used for determining the transmission power level of the initial packet (y<x).

On the other hand, there may be a time difference corresponding to a predetermined round-trip delay (RTD) (which may have, for example, six sub-frame time periods) between the time point t1 when the initial packet is transmitted and the time point t2 when the retransmission packet is transmitted. Therefore, as depicted in a dotted line in the lower portion of FIG. 4, when observed strictly, it may be assumed that the radio propagation characteristics vary depending on the time difference. However, the characteristics of the received SINR shown with solid and dotted lines are averaged characteristics determined in the open-loop control. Therefore, in a practical sense, it is conceived that it may be convenient to ignore such a time difference.

Transmission Power Control 2

In the Transmission Power Control 1 scheme described above, a case is described where the efficiency of the transmission power control may be improved by reducing the number of bits in the TPC bit pattern by changing the difference expressed in the TPC bit pattern. However, the uplink scheduling grant is provided in response to a request for allocating the PUSCH. Because of this feature, the uplink scheduling grant may not be generated periodically but is generated based on such an event as the request for allocating the PUSCH. Therefore, the above scheme may be more advantageously used when the uplink scheduling grant is reported (transmitted) every time when the PUSCH is transmitted from the user equipment (UE) terminal. However, there may be some communication systems in which the uplink scheduling grant is not always provided (transmitted) every time when the PUSCH is transmitted from the user equipment (UE) terminal. One example of such a communication system is a system in which Persistent Scheduling is performed. The Persistent Scheduling may be preferably used in a packet communication system in which, for example, it is already known that data having smaller size such as voice packets (VoIP) or real-time data are periodically generated (transmitted). When the Persistent Scheduling is performed on a user equipment (UE) terminal, it is arranged that the radio resources are periodically allocated based on a predetermined pattern. In this case, the hopping pattern of the resource blocks to be used, the frequency (i.e., cycle) of the allocation of the usable radio resources and the transmission formats of usable radio resources are provided (transmitted) in advance to the user equipment (UE) terminal. By scheduling in this way, it may become possible for the equipment (UE) terminal to periodically transmit a packet like VoIP without receiving the uplink scheduling grant every time.

According to a second embodiment of the present invention, it may be intended to optimize the transmission power level of the retransmission packet even when the uplink scheduling grant may not be transmitted every time in such a case of the Persistent Scheduling. In the Persistent Scheduling, the hopping pattern of the resource blocks to be used, the frequency (i.e., cycle) of the allocation of the usable radio resources, and the transmission formats of the usable radio resources are determined in advance with respect to not only the initial packet but also the retransmission packet.

In this embodiment, similar to the conventional method, the transmission power level of the initial packet is determined by adding the transmission power level $P_0$ determined in the open-loop control to the changed amount $\Delta_{TPC}$ from the transmission power level $P_0$. This changed amount $\Delta_{TPC}$ may be maintained constant while the Persistent Scheduling is performed. Otherwise, this amount $\Delta_{TPC}$ may be maintained constant at least in a predetermined time period including plural sub-frames and revised every predetermined time period. This changed amount $\Delta_{TPC}$ is derived from the difference between the received SINR and the target SINR of the Sounding Reference Signal (SRS).

On the other hand, the transmission power level of the retransmission packet is determined as described below. Similar to step S05 of FIG. 3, the resource block (RB1) used for the initial packet and the resource block (RB2) allocated to the retransmission packet are checked (detected). Then the difference $\Delta_{diff}$ is derived from the difference between the received SINR(f=f1) of the initial packet at frequency f1 and the received SINR(f=f2) of the retransmission packet at frequency f2. Then, the transmission power level $P_2$ of the retransmission packet is determined by adding the transmission power level $P_1$ of the initial packet to the difference $\Delta_{diff}$ expressed in the TPC bit pattern.

$$P_2 = P_1 + \Delta_{diff}$$

The user equipment (UE) terminal transmits the retransmission packet at the transmission power level determined as describe above to the base station apparatus (eNB). To that end, not only the resource blocks to be allocated in the Persistent Scheduling and the transmission formats but also the difference $\Delta_{diff}$ derived from the difference between the received SINRs is notified (transmitted) to the user equipment (UE) terminal in advance. In this case, any appropriate method may be used to notify the user equipment (UE) terminal of the difference $\Delta_{diff}$. Further, for example, the differences $\Delta_{diff}$ with respect to all the possible combinations of the retransmission packets and the preceding packets may be notified.

Figure 6:
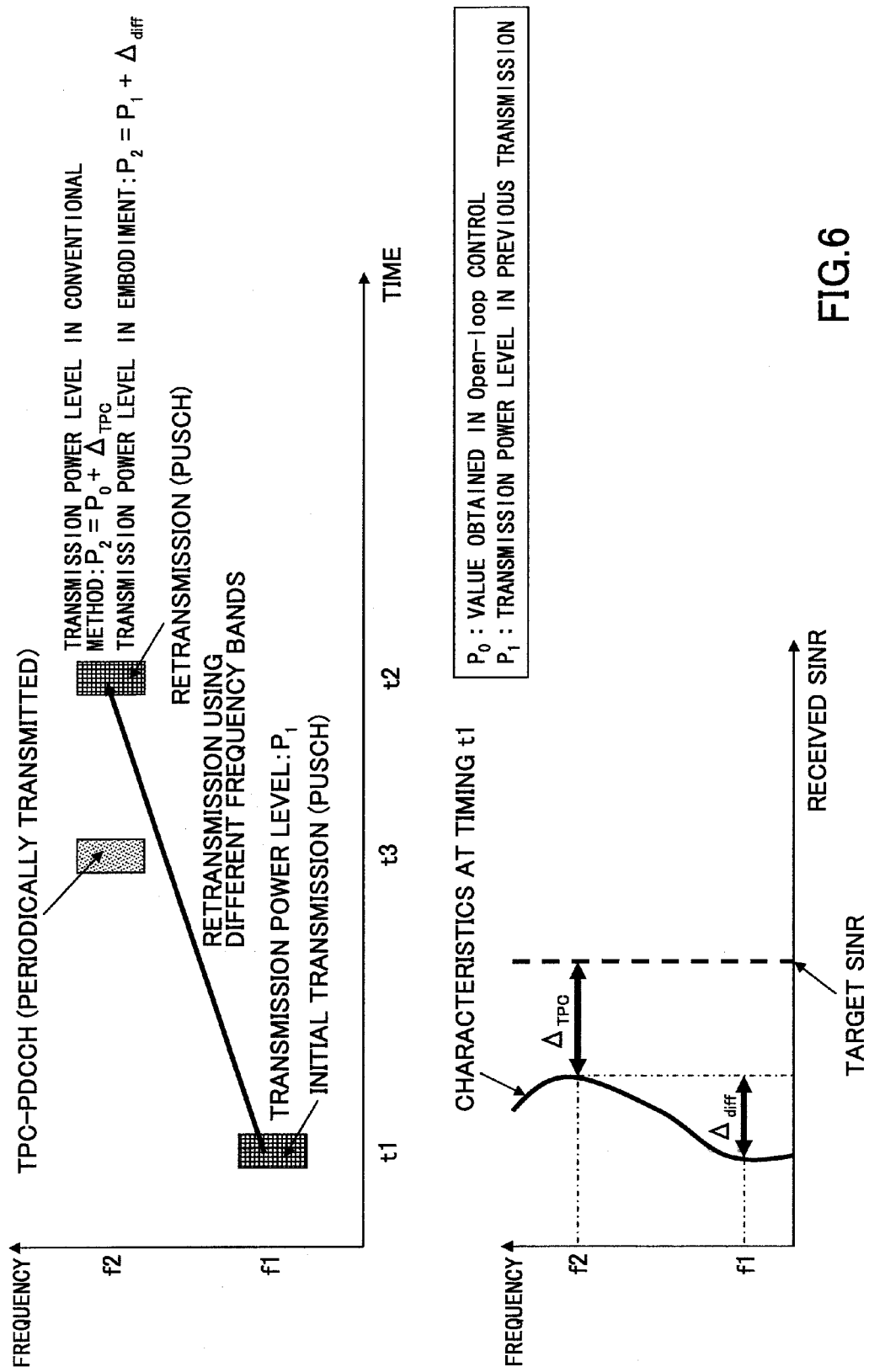
FIG. 6 is a drawing illustrating another example of the transmission power control.

In the example illustrating in FIG. 6, the difference $\Delta_{diff}$ between the received SINRs is directly notified (transmitted) to the user equipment (UE) terminal using the PDCCH periodically transmitted. In this example, it is previously determined, for example, that an initial packet is to be transmitted at the time point t1 using a resource block of frequency f1, that when the retransmission is necessary, the retransmission packet is transmitted at time point t2, and that the PDCCH is repeatedly transmitted every predetermined time period including the time point t3. The contents (settings) of the Persistent Scheduling may be determined when the connection is established, radio bearer is established or the like. Similar to the case of FIG. 4, the retransmission packet is transmitted at the transmission power level which is determined by adding the difference $\Delta_{diff}$ to the transmission power level of the initial packet.

By operating in this way, even when the Persistent Scheduling is performed, based on this embodiment of the present invention, it may become possible to optimize the transmission power level of the retransmission packet.

Base Station Apparatus (eNB)

Figure 7:
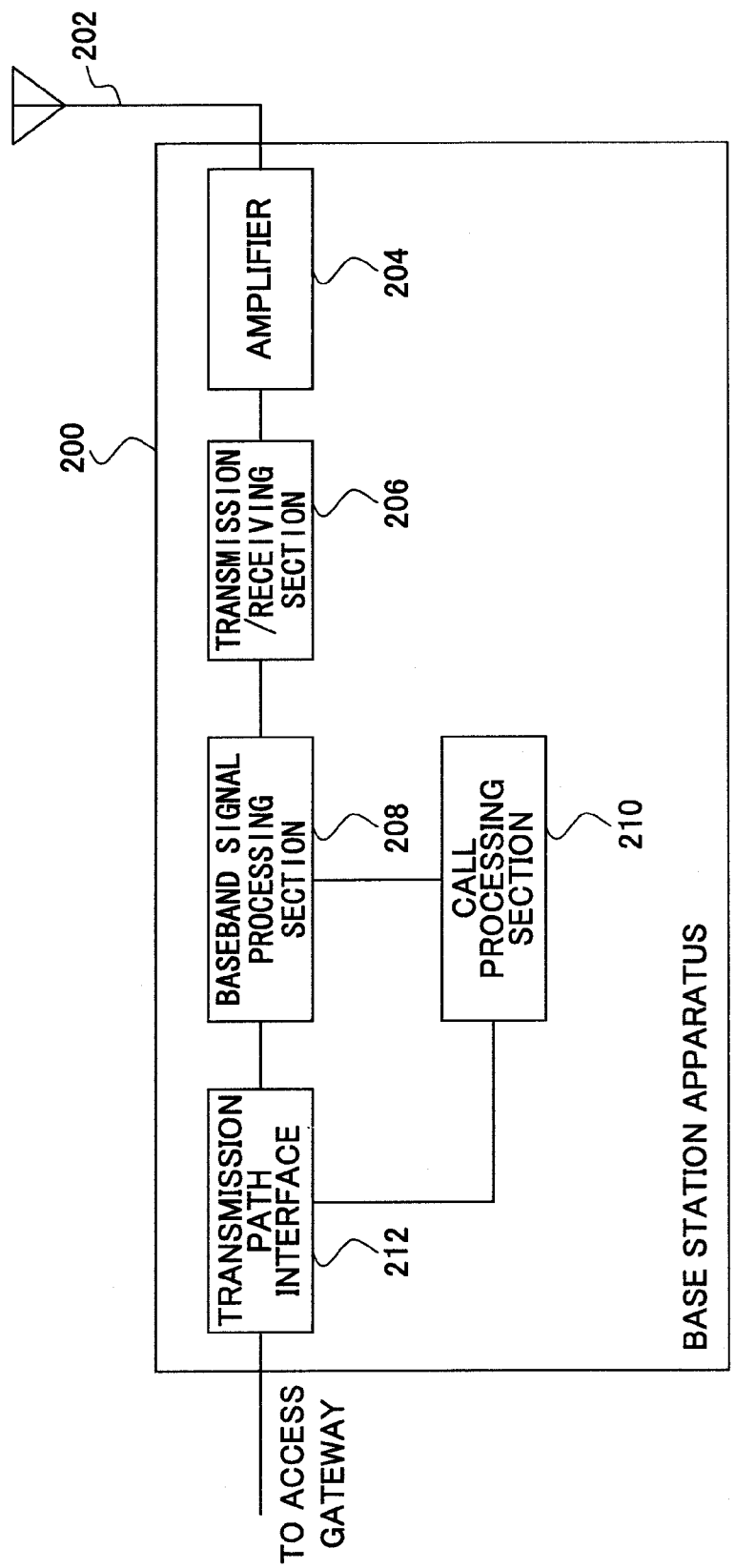
FIG. 7 is a functional block diagram of a base station apparatus eNB according to an embodiment of the present invention.

FIG. 7 illustrates an exemplary configuration of the base station apparatus (eNB) 200 according to an embodiment of the present invention. As illustrated in FIG. 7, the base station apparatus (eNB) 200 includes an antenna 202, an amplifier 204, a transmission/receiving section 206, a baseband signal processing section 208, a call processing section 210, and a transmission path interface 212.

In uplink, an uplink signal received by the antenna 202 is appropriately amplified by the amplifier 204, and transmitted to the transmission/receiving section 206. In the transmission/receiving section 206, a radio frequency signal is converted to a baseband signal, and then transmitted to the baseband signal processing section 208. In the baseband signal processing section 208, processes on the physical layer, the MAC layer, and the RLC layer are performed, which are described in detail below. The call processing section 210 performs call processes such as establishing and releasing a communication channel, managing the status of the base station apparatus (eNB), and managing the status of radio resources. The transmission path interface 212 transmits the user data received in uplink to an upper node.

On the other hand, in downlink, the user data received by the transmission path interface 212 are transferred to the baseband signal processing section 208. In the baseband signal processing section 208, processes on the RLC layer, the MAC layer, and the Physical layer are performed. After that, the downlink data are converted to a radio frequency signal in the transmission/receiving section 206, amplified by the amplifier 204, and transmitted from the antenna 202.

Figure 8:
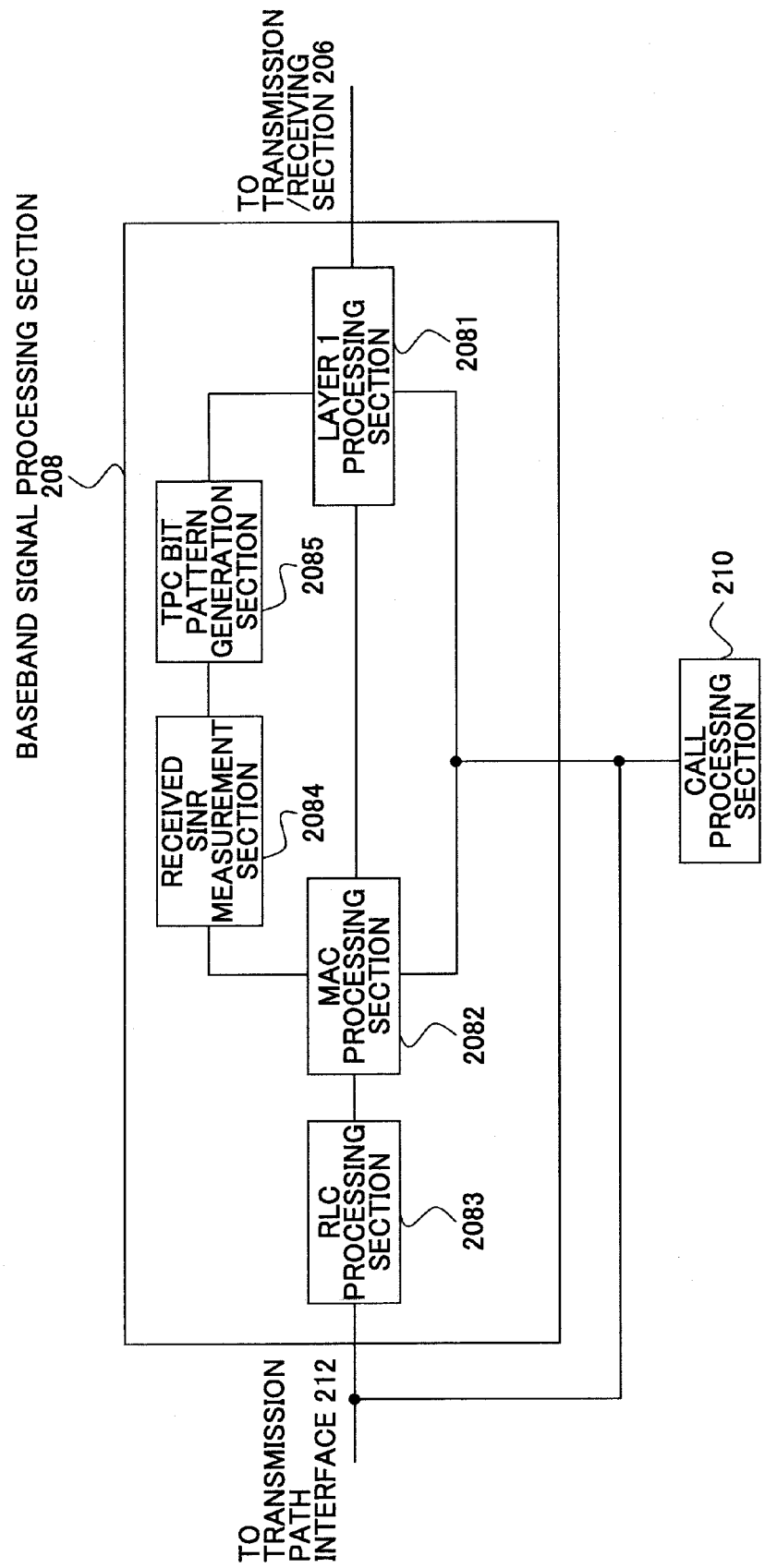
FIG. 8 is a functional block diagram of a baseband processing section of the base station apparatus eNB of FIG. 7.

FIG. 8 illustrates an exemplary configuration of the baseband signal processing section 208 of the base station apparatus (eNB) 200 in FIG. 7. As illustrated in FIG. 8, the baseband signal processing section 208 includes a layer 1 processing section 2081, a MAC processing section 2082, an RLC processing section 2083, a received SINR measurement section 2084, and a TPC bit pattern generation section 2085.

The layer 1 processing section 2081 mainly performs processes on the Physical layer. For example, with respect to a signal received in uplink, channel coding, DFT (Discrete Fourier Transformation) conversion, frequency de-mapping, IFFT (Inverse Fast Fourier Transform) conversion, data decoding and the like are performed. On the other hand, with respect to a signal to be transmitted in downlink, data coding, data modulation, frequency mapping, the IFFT (Inverse Fast Fourier Transform) conversion and the like are performed.

In the MAC processing section 2082, with respect to the signal received in uplink, processes such as MAC-layer retransmission control processes (HARQ), the uplink scheduling process, the transport format selection on the PUSCH, the resource block selection on the PUSCH and the like are performed. Further, in the MAC processing section 2082, with respect to the signal to be transmitted in downlink, processes such as the MAC retransmission control, the downlink scheduling, the transport format selection on the PDSCH, the resource block selection on the PDSCH and the like are performed.

In RLC processing section 2083, with respect to the packets received in uplink, processes such as the segmentation and concatenation on the packets and the RLC-layer retransmission control are performed. Further, in the RLC processing section 2083, with respect to the packets to be transmitted in downlink, processes such as the segmentation and concatenation on the packets and the RLC-layer retransmission control are performed.

The received SINR measurement section 2084 measures the received quality (e.g., expressed in received SINR) of the reference signal received in uplink. Generally, as the reference signal, there are the Sounding Reference Signal (SRS) and the reference signal, the Sounding Reference Signal (SRS) being periodically and continually transmitted across the entire system frequency band, the reference signal being used for decoding and transmitted a specified resource block frequency only along with the PUSCH. What is especially important in the present invention is the Sounding Reference Signal (SRS).

Figure 9:
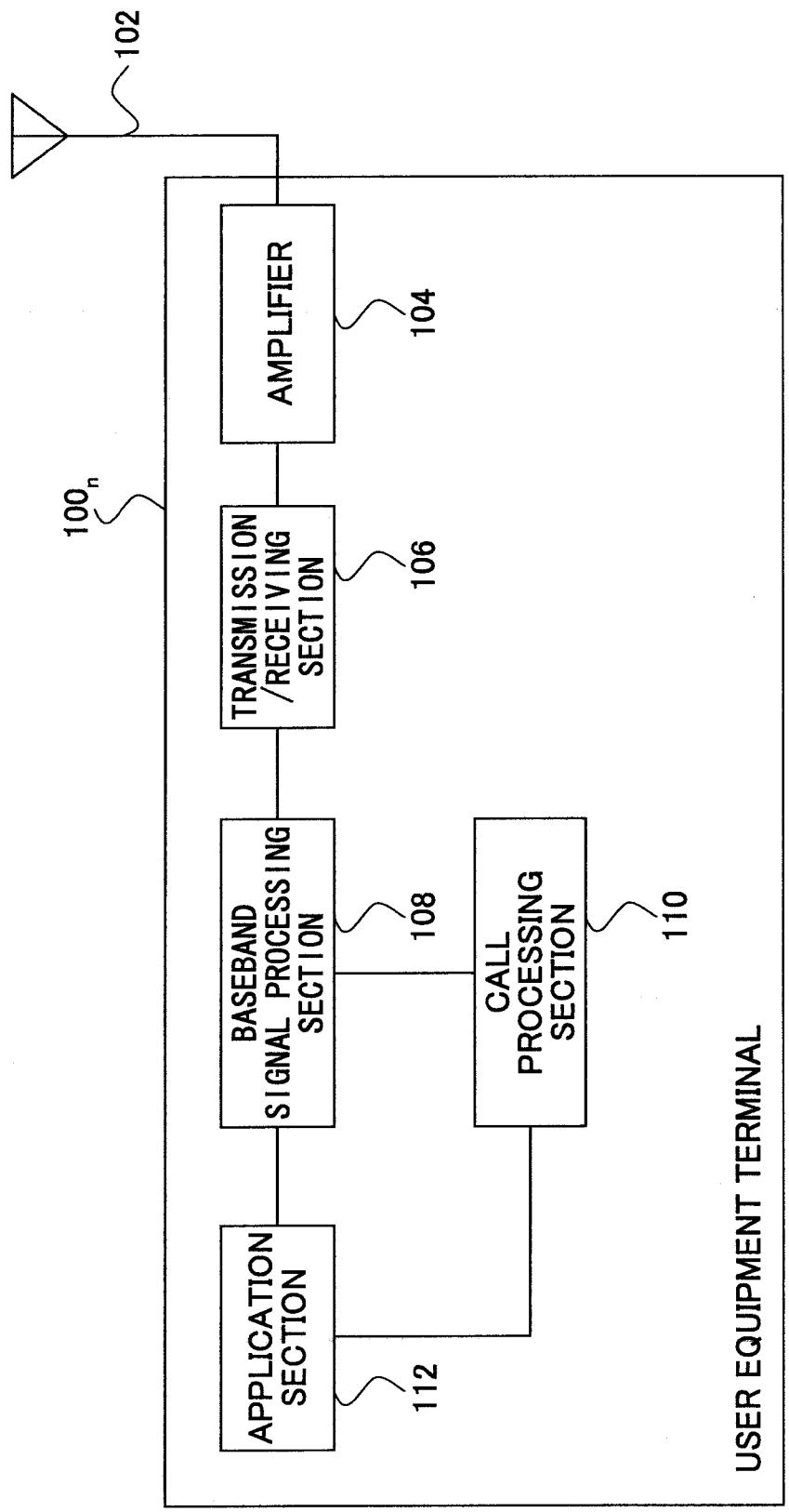
FIG. 9 is a functional block diagram of a user equipment (UE) terminal according to an embodiment of the present invention.

The TPC bit pattern generation section 2085 provides (generates) the TPC bit pattern based on the received SINR of the Sounding Reference Signal (SRS). As described with reference to FIG. 4, according to an embodiment of the present invention, the uplink scheduling grant for the retransmission packet includes the TPC bit pattern representing the difference $\Delta_{diff}$. Otherwise, as described with reference to FIG. 6, the TPC bit pattern representing the difference $\Delta_{diff}$ may be updated in a long cycle, and reported to the user equipment (UE) terminal whenever the update occurs. As the long cycle, for example, an update cycle of the radio parameters used in the Persistent Scheduling may be used, the radio parameters including the frequency of the resource block, the frequency (cycle) of the allocation of the resource blocks, the transmission format, the transmission power level and the like. User equipment (UE) terminal FIG. 9 illustrates an exemplary configuration of the user equipment (UE) terminal $100_n$. As illustrated in FIG. 9, the user equipment (UE) terminal $100_n$ includes an antenna 102, an amplifier 104, a transmission/receiving section 106, a baseband signal processing section 108, a call processing section 110, and an application section 112.

In downlink, a downlink signal received by the antenna 102 is appropriately amplified by the amplifier 104, and transmitted to the transmission/receiving section 106. In the transmission/receiving section 106, a radio frequency signal is converted to a baseband signal, and then transmitted to the baseband signal processing section 108. In the baseband signal processing section 108, processes on the physical layer, the MAC layer, and the RLC layer are performed, which are described in detail below. The call processing section 110 stores the call processing statuses of established and released communication channels, the status of the user equipment (UE) terminal $100_n$, and the status of radio resources. The application section 112 performs data processing based on various applications.

On the other hand, in uplink, the data generated in the application section 112 are transferred to the baseband signal processing section 108. In the baseband signal processing section 108, the processes on the RLC layer, the MAC layer, and the Physical layer are performed. After that, the uplink data are converted to a radio frequency signal in the transmission/receiving section 106, amplified by the amplifier 104, and transmitted from the antenna 102.

Figure 10:
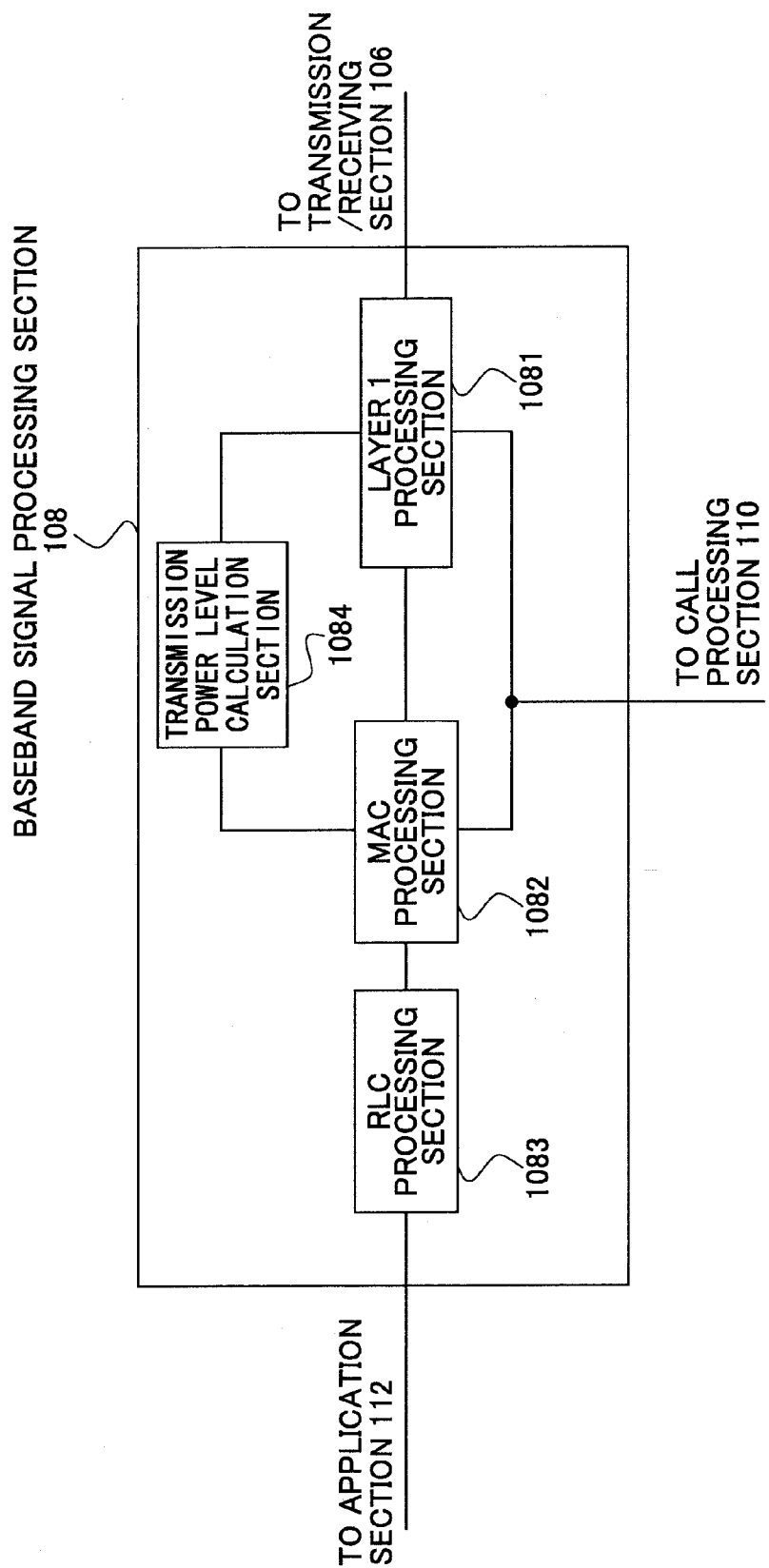
FIG. 10 is a functional block diagram of a baseband processing section of the user equipment (UE) terminal of FIG. 9.

FIG. 10 illustrates an exemplary configuration of the baseband signal processing section 108 of the user equipment (UE) terminal $100_n$ in FIG. 9. As illustrated in FIG. 10, the baseband signal processing section 108 includes a layer 1 processing section 1081, a MAC processing section 1082, an RLC processing section 1083, and a transmission power level calculation section 1084.

The layer 1 processing section 1081 mainly performs processes on the Physical layer. For example, with respect to a signal received in downlink, channel coding, FFT (Fast Fourier Transformation) conversion, frequency de-mapping, IFFT (Inverse Fast Fourier Transform) conversion, data decoding and the like are performed. On the other hand, with respect to a signal to be transmitted in uplink, channel coding, data modulation, frequency mapping, DFT (Discrete Fourier Transformation) conversion and the like are performed.

In the MAC processing section 1082, with respect to the signal received in downlink, processes such as MAC-layer retransmission control (HARQ), the analysis of the downlink scheduling information (specifying transmission format and resource blocks of PDSCH) and the like are performed. Further, in the MAC processing section 1082, with respect to the signal to be transmitted in uplink, processes such as the MAC retransmission control, the analysis of the uplink scheduling information (specifying the transmission format and the resource blocks of PUSCH), the specifying the TPC bit pattern and the like are performed.

In RLC processing section 1083, with respect to the packets received in downlink, processes such as the segmentation and concatenation on the packets and the RLC-layer retransmission control are performed. Further, in the RLC processing section 1083, with respect to the packets to be transmitted in uplink, processes such as the segmentation and concatenation on the packets and the RLC-layer retransmission control are performed.

The transmission power level calculation section 1084 determines the transmission power level of the PUSCH using the TPC bit pattern in the uplink scheduling information. As described with reference to FIG. 4, according to an embodiment of the present invention, the uplink scheduling grant for the retransmission packet includes the TPC bit pattern representing the difference $\Delta_{diff}$. Otherwise, as described with reference to FIG. 6, the TPC bit pattern representing the difference $\Delta_{diff}$ may be updated in the long cycle, and reported to the user equipment (UE) terminal whenever the update occurs. As the long cycle, for example, an update cycle of the radio parameters used in the Persistent Scheduling may be used, the radio parameters including the frequency of the resource block, the frequency (cycle) of the allocation of resource blocks, the transmission format, the transmission power level and the like.

Industrial Applicability

In the above description, the mobile communication system is assumed to be an LTE system. However, the present invention is not limited to the LTE system. For example, the present invention may be applicable to any adequate communication system in which the transmission power control is performed.

The present invention is described above by referring to a specific embodiment. However, a person skilled in the art may understand that the above embodiment is described for illustrative purpose only and may think of examples of various modifications, transformations, alterations, changes, and the like. To promote an understanding of the present invention, specific values are used as examples throughout the description. However, it should be noted that such specific values are just sample values unless otherwise described, and any other values may be used. In the above description, the present invention is described as being divided into several embodiments based on plural elements. However, it should be noted that the division into the several embodiments and the elements is not essential to the present invention. For example, two or more embodiments or elements may be combined on an as-needed basis, and an items described in an embodiment or an element may be applied to another embodiment or another element (unless contradictory). For illustrative purposes, the apparatus according to an embodiment of the present invention is described with reference to functional block diagrams. However, such an apparatus may be provided by hardware, software, or a combination thereof. The present invention is not limited to the embodiment described above, and various modifications, transformations, alteration, exchanges, and the like may be made without departing from the scope and spirit from the present invention.

The present international application claims priority from Japanese Patent Application No. 2007-322371 filed on Dec. 13, 2007, the entire contents of which are hereby incorporated herein by reference.

The invention claimed is:

1. A base station apparatus in a mobile communication system, the base station apparatus comprising:
   a measurement unit configured to measure received quality of a reference signal transmitted from a user equipment terminal;
   a scheduling unit configured to provide scheduling information indicating allocation of a radio resource in uplink; and
   a transmission unit configured to transmit a control signal to the user equipment terminal, the control signal including the scheduling information, wherein
   in a case where, after a first packet is transmitted from the user equipment terminal using a first frequency band, a retransmission packet corresponding to the first packet is transmitted from the user equipment terminal using a second frequency band other than the first frequency band, the control signal further includes information indicating a difference between received quality in the first frequency band and received quality in the second frequency band, and
   the retransmission packet is transmitted from the user equipment terminal at a transmission power level determined by adding a transmission power level of the first packet to a transmission power level corresponding to the difference.

2. The base station apparatus according to claim 1, wherein the information indicating the difference is expressed in a transmission power control bit pattern in uplink scheduling grant.

3. The base station apparatus according to claim 1, wherein the reference signal is a sounding reference signal periodically transmitted from the user equipment terminal, and the measurement unit measures the received quality per resource block.

4. A method used in a base station apparatus in a mobile communication system, the method comprising:
   a measurement step of measuring received quality of a reference signal transmitted from a user equipment terminal; and
   a transmission step of transmitting a control signal to the user equipment terminal, the control signal including scheduling information indicating allocation of a radio resource in uplink, wherein
   in a case where, after a first packet is transmitted from the user equipment terminal using a first frequency band, a retransmission packet corresponding to the first packet is transmitted from the user equipment terminal using a second frequency band other than the first frequency band, the control signal further includes information indicating a difference between received quality in the first frequency band and received quality in the second frequency band, and
   the retransmission packet is transmitted from the user equipment terminal at a transmission power level determined by adding a transmission power level of the first packet to a transmission power level corresponding to the difference.

5. A user equipment terminal in a mobile communication system, the user equipment terminal comprising:
   a receiving unit configured to receive a control signal from a base station apparatus, the control signal including scheduling information indicating allocation of a radio resource; and
   a transmission unit configured to transmit a packet to the base station apparatus in accordance with the scheduling information, wherein
   in a case where, after a first packet is transmitted to the base station apparatus using a first frequency band, a retransmission packet corresponding to the first packet is transmitted to the base station apparatus using a second frequency band other than the first frequency band, the control signal further includes information indicating a difference between received quality in the first frequency band and received quality in the second frequency band, and
   the retransmission packet is transmitted from the transmission unit at a transmission power level determined by adding a transmission power level of the first packet to a transmission power level corresponding to the difference.

6. A method used in a user equipment terminal in a mobile communication system, the method comprising:
   a receiving step of receiving a control signal from a base station apparatus, the control signal including scheduling information indicating allocation of a radio resource; and
   a transmission step of transmitting a packet to the base station apparatus in accordance with the scheduling information, wherein
   in a case where, after a first packet is transmitted to the base station apparatus using a first frequency band, a retransmission packet corresponding to the first packet is transmitted to the base station apparatus using a second frequency band other than the first frequency band, the control signal further includes information indicating a difference between received quality in the first frequency band and received quality in the second frequency band, and
   the retransmission packet is transmitted in the transmission step at a transmission power level determined by adding a transmission power level of the first packet to a transmission power level corresponding to the difference.

7. A mobile communication system including a base station apparatus and a user equipment terminal, the base station apparatus comprising:
   a measurement unit configured to measure received quality of a reference signal transmitted from the user equipment terminal;

a scheduling unit configured to provide scheduling information indicating allocation of a radio resource in uplink; and a transmission unit configured to transmit a control signal to the user equipment terminal, the control signal including the scheduling information;

the user equipment terminal comprising:

a receiving unit configured to receive the control signal from the base station apparatus, the control signal including at least scheduling information indicating allocation of the radio resource; and a transmission unit configured to transmit a packet to the base station apparatus in accordance with the scheduling information, wherein in a case where, after a first packet is transmitted from the user equipment terminal using a first frequency band, a retransmission packet corresponding to the first packet is transmitted from the user equipment terminal using a second frequency band other than the first frequency band, the control signal further includes information indicating a difference between received quality in the first frequency band and received quality in the second frequency band, and the retransmission packet is transmitted from the user equipment terminal at a transmission power level determined by adding a transmission power level of the first packet to a transmission power level corresponding to the difference.

8. A method used in a mobile communication system including a base station apparatus and a user equipment terminal, the method comprising:

a measurement step of measuring received quality of a reference signal periodically transmitted from the user equipment terminal to the base station apparatus;

a transfer step of transferring a control signal from the base station apparatus to the user equipment terminal, the control signal including scheduling information indicating allocation of a radio resource in uplink; and a transmission step of transmitting a packet to the base station apparatus in accordance with the scheduling information, wherein in a case where, after a first packet is transmitted from the user equipment terminal using a first frequency band, a retransmission packet corresponding to the first packet is transmitted from the user equipment terminal using a second frequency band other than the first frequency band, the control signal further includes information indicating a difference between received quality in the first frequency band and received quality in the second frequency band, and the retransmission packet is transmitted from the user equipment terminal at a transmission power level determined by adding a transmission power level of the first packet to a transmission power level corresponding to the difference.

9. A base station apparatus in a mobile communication system, the base station apparatus comprising:

a measurement unit configured to measure received quality of a reference signal per resource block, the reference signal being received from a user equipment terminal; and a notification unit configured to notify the user equipment terminal of a radio resource usable by the user equipment terminal in uplink when persistent scheduling is performed, wherein the notification unit notifies the user equipment terminal of a fact that, after a first packet is transmitted from the user equipment terminal using a first frequency band, a retransmission packet corresponding to the first packet is to be transmitted from the user equipment terminal using a second frequency band other than the first frequency band, and of information indicating a difference between received quality in the first frequency band and received quality in the second frequency band, and the retransmission packet is transmitted from the user equipment terminal at a transmission power level determined by adding a transmission power level of the first packet to a transmission power level corresponding to the difference.

10. A method used in a base station apparatus in a mobile communication system, the method comprising:

a measurement step of measuring received quality of a reference signal per resource block, the reference signal being received from a user equipment terminal; and a notification step of notifying the user equipment terminal of a radio resource usable by the user equipment terminal in uplink when persistent scheduling is performed, wherein in the notification step, a fact that, after a first packet is transmitted from the user equipment terminal using a first frequency band, a retransmission packet corresponding to the first packet is to be transmitted from the user equipment terminal using a second frequency band other than the first frequency band, and information indicating a difference between received quality in the first frequency band and received quality in the second frequency band are reported to the user equipment terminal, and the retransmission packet is transmitted from the user equipment terminal at a transmission power level determined by adding a transmission power level of the first packet to a transmission power level corresponding to the difference.

11. A user equipment terminal in a mobile communication system, the user equipment terminal comprising:

a receiving unit configured to receive a notice of a radio resource usable in uplink, the notice being received from the base station apparatus, when persistent scheduling is performed, and a transmission unit configured to transmit a packet to the base station apparatus using the radio resource, wherein the notice includes a fact that, after a first packet is transmitted from the user equipment terminal using a first frequency band, a retransmission packet corresponding to the first packet is to be transmitted from the user equipment terminal using a second frequency band other than the first frequency band, and information indicating a difference between received quality in the first frequency band and received quality in the second frequency band, and the retransmission packet is transmitted from the transmission unit at a transmission power level determined by adding a transmission power level of the first packet to a transmission power level corresponding to the difference.

12. A method used in a user equipment terminal in a mobile communication system, the method comprising:

a receiving step of receiving a notice of a radio resource usable in uplink, the notice being received from the base station apparatus, when persistent scheduling is performed, and a transmission step of transmitting a packet to the base station apparatus using the radio resource, wherein the notice includes a fact that, after a first packet is transmitted from the user equipment terminal using a first frequency band, a retransmission packet corresponding to the first packet is to be transmitted from the user equipment terminal using a second frequency band other than the first frequency band, and information indicating a difference between received quality in the first frequency band and received quality in the second frequency band, and the retransmission packet is transmitted in the transmission step at a transmission power level determined by adding a transmission power level of the first packet to a transmission power level corresponding to the difference.

13. A mobile communication system including a base station apparatus and a user equipment terminal, the base station apparatus comprising:

a measurement unit configured to measures received quality of a reference signal per resource block, the reference signal being received from the user equipment terminal; and a notification unit configured to notify the user equipment terminal of a radio resource usable by the user equipment terminal in uplink when persistent scheduling is performed;

the user equipment terminal comprising:

a receiving unit configured to receive the notice from the base station apparatus, and a transmission unit configured to transmit a packet to the base station apparatus using the radio resource, wherein the notification unit of the base station apparatus notifies the user equipment terminal of a fact that, after a first packet is transmitted from the user equipment terminal using a first frequency band, a retransmission packet corresponding to the first packet is to be transmitted from the user equipment terminal using a second frequency band other than the first frequency band, and of information indicating a difference between received quality in the first frequency band and received quality in the second frequency band, and the retransmission packet is transmitted from the user equipment terminal at a transmission power level determined by adding a transmission power level of the first packet to a transmission power level corresponding to the difference.

14. A method used in a mobile communication system including a base station apparatus and a user equipment terminal, the method comprising:

a measurement step in which the base station apparatus measures received quality of a reference signal per resource block, the reference signal being received from the user equipment terminal;

a notifying step in which the base station apparatus notifies the user equipment terminal of a radio resource usable by the user equipment terminal in uplink when persistent scheduling is performed; and a transmission step in which the user equipment terminal transmits a packet to the base station apparatus using the radio resource, wherein the base station apparatus notifies the user equipment terminal of a fact that, after a first packet is transmitted from the user equipment terminal using a first frequency band, a retransmission packet corresponding to the first packet is to be transmitted from the user equipment terminal using a second frequency band other than the first frequency band, and of information indicating a difference between received quality in the first frequency band and received quality in the second frequency band, and the retransmission packet is transmitted from the user equipment terminal at a transmission power level determined by adding a transmission power level of the first packet to a transmission power level corresponding to the difference.

* * * * *